United States Patent
Maan

(10) Patent No.: US 11,816,135 B2
(45) Date of Patent: Nov. 14, 2023

(54) METHOD, SYSTEM, AND COMPUTER PROGRAM PRODUCT FOR RETRIEVING RELEVANT DOCUMENTS

(71) Applicant: GREYB RESEARCH PRIVATE LIMITED, Chandigarh (IN)

(72) Inventor: Mahesh Maan, Mohali (IN)

(73) Assignee: GREYB RESEARCH PRIVATE LIMITED, Chandigarh (IN)

( * ) Notice: Subject to any disclaimer, the term of this patent is extended or adjusted under 35 U.S.C. 154(b) by 0 days.

(21) Appl. No.: 16/571,079

(22) Filed: Sep. 14, 2019

(65) Prior Publication Data
US 2020/0349177 A1 Nov. 5, 2020

(51) Int. Cl.
G06F 16/00 (2019.01)
G06F 16/332 (2019.01)
G06F 16/35 (2019.01)
G06F 16/383 (2019.01)
G06F 16/93 (2019.01)

(52) U.S. Cl.
CPC ........ *G06F 16/3328* (2019.01); *G06F 16/358* (2019.01); *G06F 16/383* (2019.01); *G06F 16/93* (2019.01)

(58) Field of Classification Search
CPC .. G06F 16/3328; G06F 16/358; G06F 16/383; G06F 16/93; G06F 16/3326
See application file for complete search history.

(56) References Cited

U.S. PATENT DOCUMENTS

| | | | |
|---|---|---|---|
| 6,324,534 B1* | 11/2001 | Neal | G06F 16/951 709/224 |
| 2005/0144067 A1* | 6/2005 | Farahat | G06Q 30/02 705/14.52 |
| 2007/0208669 A1* | 9/2007 | Rivette | G06Q 50/184 705/59 |
| 2008/0140643 A1* | 6/2008 | Ismalon | G06F 16/24578 |
| 2008/0268876 A1* | 10/2008 | Gelfand | H04W 4/02 455/457 |
| 2009/0187843 A1* | 7/2009 | Itoh | G06F 16/951 715/769 |

(Continued)

FOREIGN PATENT DOCUMENTS

KR 20080065520 A * 7/2008

*Primary Examiner* — Syed H Hasan

(57) ABSTRACT

A method, corresponding system, and computer program product for retrieving relevant documents is disclosed. The method includes running, by a processor, an enhanced query comprising a set of parameters based on which a relevancy of a document is determined. The set of parameters includes one or more of keywords, classification codes, time period, assignees, inventors, authors, and section properties. Thereafter, the processor assigns a score to one or more documents returned in response to running the enhanced query, wherein the score is determined by a scoring algorithm. The scoring algorithm evaluates a degree to which the enhanced query parameters are matched in the at least one document for computing the score. Finally, the processor selects relevant documents from the one or more documents based on the assigned score. The relevant documents are selected based on the assigned score fulfilling one or more predetermined criteria.

20 Claims, 11 Drawing Sheets

---

Select the relevant documents from the at least one returned document determined as relevant based on the assigned score — 602

Render the relevant documents to the user in an order which is based on the weight function and the classification criterion — 604

Display a visual map to the user for the rendered relevant documents in order to assist the user in analyzing the rendered relevant documents — 606

(56) References Cited

U.S. PATENT DOCUMENTS

| | | | |
|---|---|---|---|
| 2010/0110099 A1* | 5/2010 | Averett | G06F 16/3328 |
| | | | 345/592 |
| 2010/0228744 A1* | 9/2010 | Craswell | G06F 16/9577 |
| | | | 707/E17.014 |
| 2011/0137933 A1* | 6/2011 | Pelenur | G06F 16/338 |
| | | | 707/769 |
| 2011/0276562 A1* | 11/2011 | Madden-Woods | |
| | | | G06F 16/9038 |
| | | | 707/E17.014 |
| 2011/0301831 A1* | 12/2011 | Setlur | G06F 16/29 |
| | | | 715/764 |
| 2012/0030013 A1* | 2/2012 | Tsay | G06Q 30/0251 |
| | | | 715/730 |
| 2012/0330946 A1* | 12/2012 | Arredondo | G06F 16/24575 |
| | | | 707/728 |
| 2013/0268519 A1* | 10/2013 | Cucerzan | G06F 16/951 |
| | | | 707/723 |
| 2015/0310005 A1* | 10/2015 | Ryger | G06F 16/3334 |
| | | | 707/706 |
| 2015/0356622 A1* | 12/2015 | Dhawan | G06Q 30/0269 |
| | | | 705/14.66 |
| 2016/0188608 A1* | 6/2016 | Brewer | G06F 16/90324 |
| | | | 707/767 |

* cited by examiner

Scoring Function

```
┌─────────────────────────────────────────────────────────┐
│ Select the relevant documents from the at least one returned │─ 602
│ document determined as relevant based on the assigned   │
│                      score                              │
└─────────────────────────────────────────────────────────┘
                            │
                            ▼
┌─────────────────────────────────────────────────────────┐
│ Render the relevant documents to the user in an order which │─ 604
│ is based on the weight function and the classification criterion │
└─────────────────────────────────────────────────────────┘
                            │
                            ▼
┌─────────────────────────────────────────────────────────┐
│ Display a visual map to the user for the rendered relevant │─ 606
│ documents in order to assist the user in analyzing the  │
│             rendered relevant documents                 │
└─────────────────────────────────────────────────────────┘
```

FIG. 6A

| Document | "Power" | "Control" | Term Frequency Score |
|----------|---------|-----------|----------------------|
| D1       | 100     | 2         | 102                  |
| D2       | 1       | 100       | 101                  |
| D3       | 30      | 30        | 60                   |

FIG. 6b

| Frequency | Additional Score | Overall Score | Note |
|-----------|------------------|---------------|------|
| 0  | 0   | 0   |                        |
| 1  | 0.1 | 0.1 | Initial region starts  |
| 2  | 0.2 | 0.3 |                        |
| 3  | 0.3 | 0.6 |                        |
| 4  | 0.4 | 1.0 |                        |
| 5  | 0.5 | 1.5 | Liner Region Starts    |
| 6  | 0.5 | 2.0 |                        |
| 7  | 0.5 | 2.5 |                        |
| 8  | 0.5 | 3.0 |                        |
| 9  | 0.5 | 3.5 |                        |
| 10 | 0.5 | 4.0 |                        |
| 11 | 0.4 | 4.4 | Saturation region starts |
| 12 | 0.4 | 4.8 |                        |
| 13 | 0.3 | 5.1 |                        |

FIG. 6C

METHOD, SYSTEM, AND COMPUTER PROGRAM PRODUCT FOR RETRIEVING RELEVANT DOCUMENTS

CROSS-REFERENCE TO RELATED APPLICATIONS

This application claims priority benefits under 35 U.S.C. § 119(b) to Indian Application No. 201911007537, filed on Feb. 26, 2019, which is hereby incorporated by reference in its entirety.

TECHNICAL FIELD

The present invention relates generally to searching documents in a database, and particularly to methods and systems for retrieving relevant documents from a database.

BACKGROUND

The Internet is home to various sources of information. As more and more documents are converted in to electronic form in today's world, there is an increasing demand for retrieving relevant documents. Typically, a user runs one or more queries on the Internet or on various domains or databases residing on the Internet to retrieve documents of interest to the user. Given the exponential increases in size of information with every passing day, it has become a major challenge for users to retrieve relevant documents that they are seeking on the Internet. Moreover, the volume, variety and veracity of information present in the various documents precludes exhaustive inspection and retrieval of relevant documents.

Some of the commonly used approaches for searching and retrieving relevant documents include keyword based searching, author based searching, and classification based searching. However, these approaches are not exhaustive and often return a large number of documents. A user has to invest a lot of time and resources to review the large number of documents in order to identify the relevant documents. Further, these approaches are rigid and unidirectional in their operation and there are no provisions to modify the search query based on feedback received or observed once the searches are run by the user.

Thus, the commonly used searching approaches for identifying and retrieving relevant documents suffer from various shortcoming and there is a need for a method and a system that retrieves relevant documents from a database in an efficient manner.

SUMMARY

In one embodiment, a method of retrieving relevant documents for a user is disclosed. The method includes running, by a processor, an enhanced query comprising a set of parameters based on which a relevancy of a document is determined, the set of parameters comprising at least one of keywords, classification codes, time period, assignees, inventors, authors, and section properties; assigning, by the processor a score to at least one document returned in response to running the enhanced query, wherein the score is determined by a scoring algorithm, the scoring algorithm evaluating a degree to which the enhanced query parameters are matched in the at least one document; and selecting, by the processor, relevant documents from the at least one document based on the assigned score, wherein the relevant documents are selected based on the assigned score fulfilling at least one predetermined criteria, the at least one predetermined criteria comprising the assigned score being greater than a given threshold; and the assigned score being greater than score of a given fraction of scored documents.

In another embodiment, a system for retrieving relevant documents for a user is disclosed. The system comprising a database, the database comprising a plurality of documents; and a computing device operatively coupled with the database, the computing device comprising a memory and a processor. The processor is configured to run an enhanced query comprising a set of parameters based on which a relevancy of a document is determined, the set of parameters comprising at least one of keywords, classification codes, time period, assignees, inventors, authors, and section properties; assign a score to at least one document returned in response to running the enhanced query, wherein the score is determined based on a scoring algorithm, the scoring algorithm evaluating a degree to which the enhanced query parameters are matched in the at least one document; and select relevant documents from the at least one document based on the assigned score, wherein the relevant documents are selected based on the assigned score fulfilling at least one predetermined criteria, the at least one predetermined criteria comprising the assigned score being greater than a given threshold; and the assigned score being greater than score of a given fraction of scored documents.

In yet another embodiment, a computer-usable medium is disclosed, the computer-usable medium having non-transitory computer readable instructions stored thereon for execution by a processor in a computing device to perform a method for running an enhanced query comprising a set of parameters based on which a relevancy of a document is determined, the set of parameters comprising at least one of keywords, classification codes, time period, assignees, inventors, authors, and section properties; assigning a score to at least one document returned in response to running the enhanced query, wherein the score is determined based on a scoring algorithm, the scoring algorithm evaluating a degree to which the enhanced query parameters are matched in the at least one document; and selecting relevant documents from the at least one document based on the assigned score, wherein the relevant documents are selected based on the assigned score fulfilling at least one predetermined criteria, the at least one predetermined criteria comprising the assigned score being greater than a given threshold; and the assigned score being greater than score of a given fraction of scored documents.

BRIEF DESCRIPTION OF THE DRAWINGS

The accompanying drawings, which are incorporated in and constitute a part of this disclosure, illustrate exemplary embodiments and, together with the description, serve to explain the disclosed principles.

FIG. 6a illustrates a flowchart of a method for displaying a visual map associated with the rendered relevant documents to the user, in accordance with an embodiment.

FIG. 6b illustrates a table showing scoring of documents using conventional approach of term frequency scoring method.

FIG. 6c illustrates a table showing method of scoring documents using the scoring function.

DETAILED DESCRIPTION OF THE DRAWINGS

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Various embodiments of the invention provide methods, systems, and computer program products for retrieving relevant documents. The method includes running, by a processor, an enhanced query comprising a set of parameters based on which a relevancy of a document is determined, the set of parameters comprising at least one of keywords, classification codes, time period, assignees, inventors, authors, and section properties. Thereafter, a score is assigned to at least one document returned in response to running the enhanced query, wherein the score is determined by a scoring algorithm, the scoring algorithm evaluating a degree to which the enhanced query parameters are matched in the at least one document. Finally, relevant documents are selected from the at least one document based on the assigned score, wherein the relevant documents are selected based on the assigned score fulfilling at least one predetermined criteria. The at least one predetermined criteria comprising the assigned score being greater than a given threshold and the assigned score being greater than score of a given fraction of scored documents.

Figure 1:
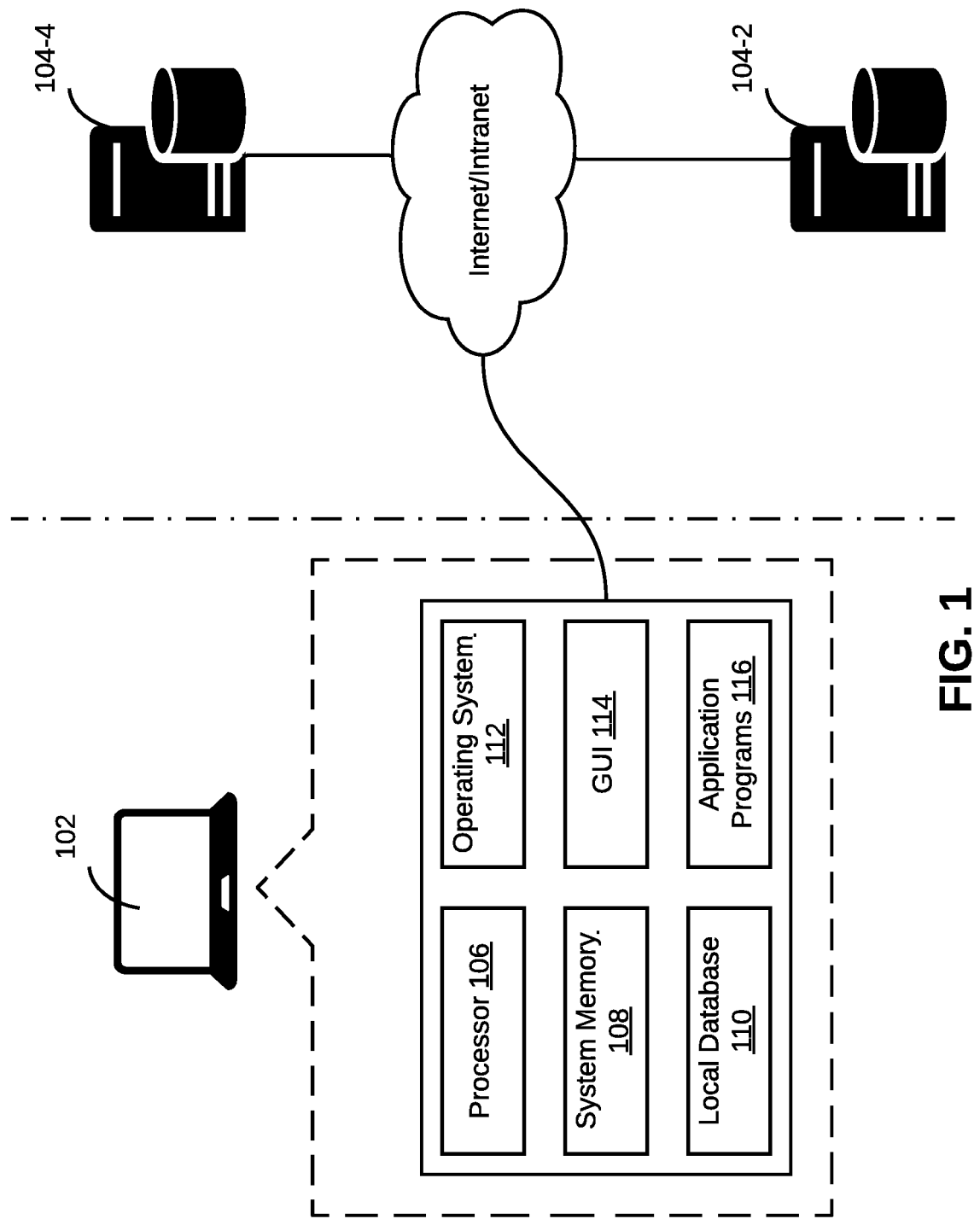
FIG. 1 is a system diagram illustrating an exemplary computer system 100, in which embodiments of the present inventive concepts may be employed.

FIG. 1 is a system diagram illustrating an exemplary computer system 100, in which embodiments of the present inventive concepts may be employed. Computer system 100 includes a user workstation 102 and a plurality of network servers/database 104-n operatively coupled to user workstation 102. Thus, in FIG. 1 for illustrative purpose, network server/database 104-2 and network server/database 104-4 are shown as connected to user workstation 102. User workstation 102 includes a processor 106, a system memory 108, a local database 110, an operating system 112, a Graphical User Interface (GUI) 114, and Application Programs 116. Network servers/database 104-n could be implemented as part of a private cloud, hybrid cloud, public cloud, local server, or a server located anywhere on the Internet. Network servers/database 104-n may be used for housing various forms of data such as, but not limited to, documents, information, records, images, media, audio, video, and various types of files. Users of computer system 100 may retrieve data stored on network server/database 104-n that they wish to access by running searches or queries on user workstation 102. Based on the search or query input by a user, one or more documents are retrieved from network server/database 104-n and displayed on GUI 114.

Figure 2:
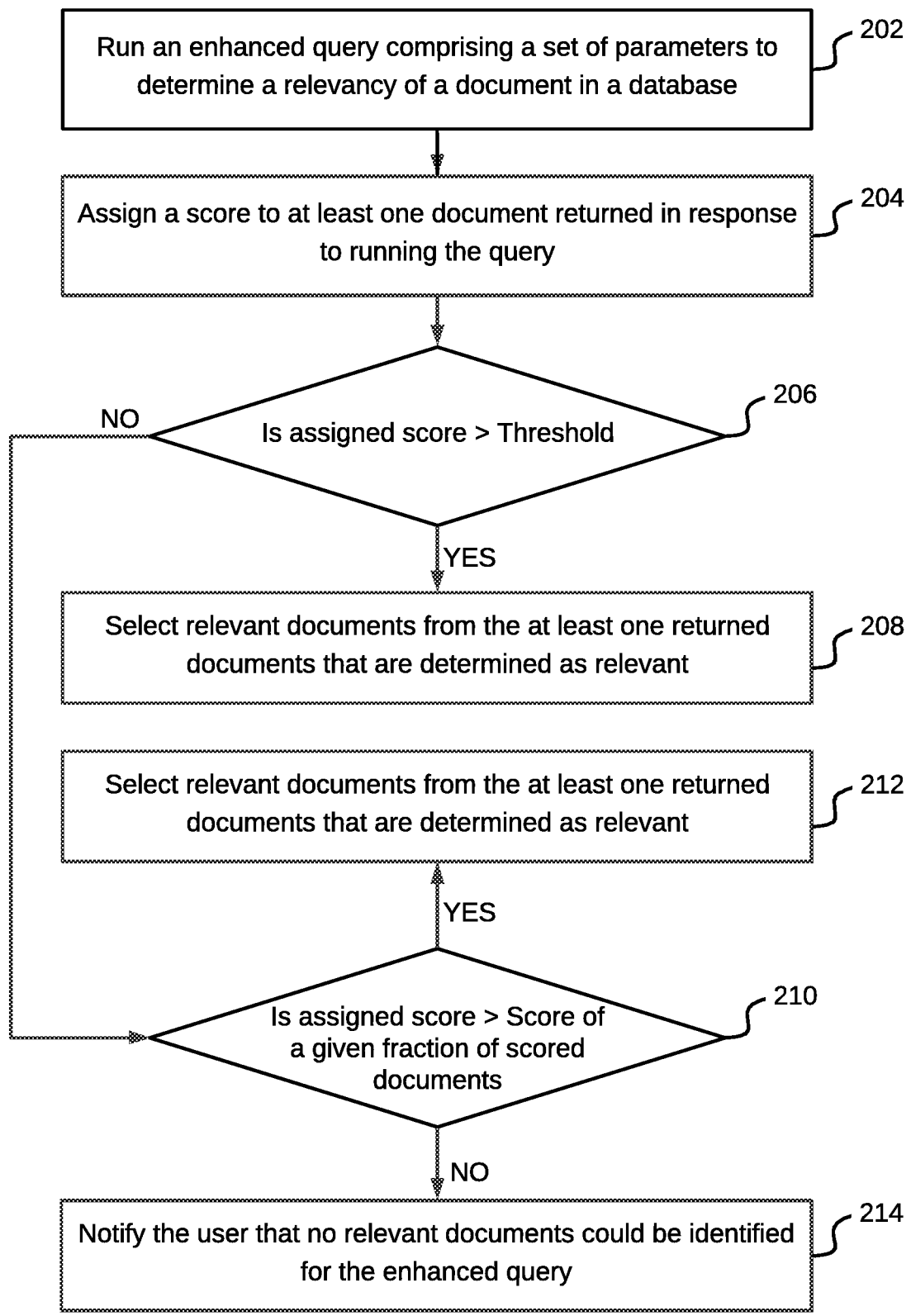
FIG. 2 illustrates a flowchart of a method for retrieving relevant documents for a user, in accordance with an embodiment.

FIG. 2 illustrates a flowchart of a method for retrieving relevant documents for a user, in accordance with an embodiment. As explained in conjunction with FIG. 1, computer system 100 may store a plurality of documents in the one or more network servers or databases. A user may access the plurality of documents using one or more workstations or computing devices that are operatively coupled to the network servers or database. Initially, the user inputs a query using a GUI associated with the workstation. The input query may comprise one or more parameters that are input by the user to capture the relevant documents. Examples of the one or more parameters include, but are not limited to, one or more keywords, classification codes, time period, assignees, inventors, authors, search terms, restrictions, filters, jurisdictions, database sources, and document section properties. Thereafter, the input query is enhanced, either semi-automatically by considering suggestions by the user or automatically without taking any user assistance, to produce an enhanced query.

The enhanced query is a set of parameters or components on the basis of which relevancy of a document may be determined. The input query may be modified to produce the enhanced query using one or more approaches. Examples of the one or more approaches may include, but are not limited to, adding or removing equivalent search terms, also referred herein as synonyms (the synonyms may not always be direct, linguistic synonyms for the keyword and may only be related in some meaningful sense to the keywords in the input query), adding or removing classification codes, adding or removing disambiguation, adding or removing semantic specifications, adding or removing document identifiers, adding or removing weights for the search terms, adding or removing truncations, and adding or removing anchor-citation points. It will be evident to a person skilled in the art that the input query may be modified to produce the enhanced query using any one or combination of the approaches mentioned above.

In an embodiment, to produce the enhanced query, the synonyms may be obtained from a look-up table or may be obtained by extracting synonyms from all documents that exists in a database in real-time, i.e. after the input query has been received from the user. The look-up table which is used for obtaining the synonyms may be generated either manually by a user or automatically by extracting synonyms from a set of documents, before receiving the input query from the user. The set of documents may correspond to a set of all documents existing in a database, or may correspond to a set selected by the user from multiple sets existing in a database. The set of documents may also be supplied by the user, wherein the user may manually upload the documents. Further, the set of documents may also correspond to a set which is extracted automatically from documents existing in a database. The set may be extracted on the basis of input query terms or on the basis of the classification codes that are selected automatically on the basis of input query terms.

The classification codes for enhancing the input query may be obtained from a look-up table, wherein the look-up table may be generated manually by the user or may be generated automatically through term-class concordance, as is well known in the art. In the same manner, the disambiguation may be performed for enhancing the input query either manually by the user or automatically. In an embodiment, the manual disambiguation may be performed by the user by manually selecting one of multiple meanings presented to the user for a search term. The multiple meanings for a search term may be extracted from a look-up table which is generated either manually or automatically on the basis of classification codes based correlation analysis. In another embodiment, the multiple meanings for a search term may be extracted on the basis of classification codes based analysis that may occur in real-time on the basis of input query. The automatic disambiguation for a search term may be performed on the basis of rest of the search terms in the input query, or by determining an appropriate field for the search term, wherein the field may correspond to one or more of classification codes, assignees, authors, and inventors.

Providing semantic specifications of one or more keywords in input query in order to enhance the input query may be performed either manually, where the semantic specification of a search term is input by the user or may be performed automatically, where the semantic specification is automatically decided on the basis of other search terms in the input query. For example, based on user's input or automatic determination of semantic specification for a search term, the search term may be considered only as noun and not as a verb. In an embodiment, the automatically determined semantic specification may be verified or modified by the user.

A weight for a search term may be added or removed for enhancing the input query either manually or determined using a look-up table that contains frequency of terms within a set of documents. The weight associated with each search terms provides the relative importance of a search term compared to the rest of the search terms in the input query. In an embodiment, the look-up table that contains the frequency of terms may correspond to a look-up table of multiple look-up tables, wherein the look-up table may be selected either manually by the user or automatically either on the basis of input query search terms or on the basis of combination of input query search terms. The documents associated with each look-up table may belong to the same classification code, or time period, assignee, author, inventor, or combination of all. In another embodiment, the look-up table may be generated dynamically on the basis of inputs by the user. The user may provide inputs in the form of a query, a classification code, a time period, assignee, inventor, author, or combination of all.

Truncations may be added or removed for enhancing the input query either through an algorithm or through a look-up table. Once the truncations are determined, the user may manually verify the truncations before enhancing the input query. In an embodiment, when more than one type of truncations is available, a user input may be taken to narrow down to one of the type of truncation to be used for enhancing the input query. In the same manner, anchor-citation points are determined for enhancing the input query either manually, wherein the user provides the input on anchor-citation point or may be selected on the basis of input query. An anchor-citation point corresponds to documents known to be relevant or highly likely to be relevant, and therefore may be used for finding more relevant documents using citation analysis. In an embodiment, the anchor-citation point may be selected on the basis of input query or determined using monitoring feedback data. This is further explained in detail in conjunction with FIG. 8. The input query used for determining anchor-citation point may be related to a look-up table containing concordance data for query components (this lookup table may form a mapping between keywords, or combination of keywords and one or more relevant documents), or history of analysis. In an embodiment, the anchor-citation point which is automatically determined for enhancing the query may be verified or modified by the user.

After the enhanced query is produced by modifying the input query provided by the user using the one or more approaches, at step 202, a processor associated with the workstation of the user runs the enhanced query. Alternatively, in an embodiment, the enhanced query may be run on a processor that is not associated with the user. For example, the enhanced query may be run on a remote workstation or on the cloud or a server. The processor analyzes the enhanced query input by the user to determine relevancy of a document. For example, the processor analyzes the documents stored in the one or more network servers or databases based on the one or more parameters associated with the enhanced query and accordingly determines the relevancy of a document. The documents that are determined as relevant are tagged so that they can be returned as output of running the enhanced query.

Once the relevancy is determined, thereafter, at step 204, the processor assigns a score to one or more documents that are returned in response to running the enhanced query. The score is assigned to the one or more returned documents that are determined as relevant by using a scoring algorithm. The scoring algorithm evaluates a degree to which the enhanced query parameters are matched in the one or more returned documents that are determined as relevant. The enhanced query parameters that are considered for evaluating the degree may include, but are not limited to keywords, a field of search, a term frequency, a generic index, classification codes, time period, assignees, inventors, authors, and section properties associated with the returned documents that are determined as relevant. The operation of the scoring algorithm is further explained in detail in conjunction with FIG. 3.

In response to assignment of the score by the processor to the one or more returned documents that are determined as relevant, the processor then proceeds to select a refined set of relevant documents based on whether the assigned score fulfills one or more predetermined criteria. The one or more predetermined criteria could be specified by the user before the enhanced query is run or specified by the user after running the enhanced query. Alternatively, the one or more predetermined criteria could be automatically generated by the processor based on the enhanced query and/or based on the one or more returned documents that are determined as relevant. Examples of the one or more predetermined criteria may include, but are not limited to threshold calculation, weights, and domain of search.

Thus, at step 206, the processor determines whether the assigned score is greater than a given threshold. If the assigned score is greater than the given threshold, at step 208, the processor selects relevant documents from the one more returned documents that are determined as relevant. Alternatively, If the assigned score is not greater than the given threshold, then at step 210, the processor may determine whether the assigned score is greater than score of a given fraction of scored documents. The given fraction of score documents may be specified by the user or automatically selected by the processor. If the assigned score is greater than the score of the given fraction of documents, then at step 212, the processor selects relevant documents from the one or more relevant documents that are determined as relevant. This is further explained in detail in conjunction with FIG. 5.

In an embodiment, the processor may select relevant documents from the one or more returned documents that are determined as relevant based on whether the relevant document satisfies all the enhanced query parameters. In another embodiment, the processor may select relevant documents from the one or more returned documents that are determined as relevant based on whether the document satisfies at least a threshold fraction of the enhanced query parameters. In the event where the assigned score is not greater than the given threshold and is not greater than the score of the given fraction of documents, at step 214, the processor may notify to the user that no relevant documents could be identified for the enhanced query. The one or more predetermined criteria based on which the processor selects the relevant documents may be executed by the processor either serially or in parallel. Also, it will be evident to a person skilled in the art that the one or more predetermined criteria can be modified by the user over a period of time, or for each enhanced query that is executed.

Figure 3:
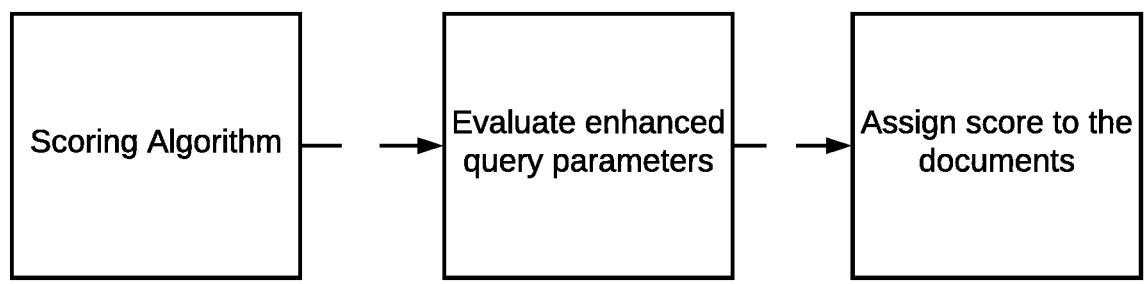
FIG. 3 is a schematic diagram illustrating operation of the scoring algorithm, in accordance with an embodiment.

FIG. 3 is a schematic diagram illustrating operation of the scoring algorithm, in accordance with an embodiment. In order to assign the score, the scoring algorithm evaluates a degree to which the enhanced query parameters are matched in the one or more returned documents that are determined as relevant. The enhanced query parameters include, but are not limited to keywords, field of search, a term frequency, a generic index, classification codes, time period, assignees, inventors, authors, and section properties associated with the returned documents that are determined as relevant. For instance, the scoring algorithm may evaluate fields in a document where the keywords appear for assigning the score. The assigned score may vary based on the fields where the keywords appear or may be fixed irrespective of the fields where the keywords appear. The score for different fields may be set by the user or maybe automatically determined by the scoring algorithm. In the same manner, the assigned score may depend on term frequency where the number of times a keyword appears in the document determines the score that will be assigned to a document. In an embodiment, the score may saturate after a given threshold term frequency, wherein the score would not increase beyond a certain point. In another embodiment, the score may be set by a scoring function. The scoring function represents a function between the score and the term frequency. The scoring function's curve is S-shaped and is further explained in detail in conjunction with FIG. 4.

A generic index of the keywords may also be considered for evaluating the degree to which the enhanced query parameters are matched in the documents. The generic index is a measure of how generic is the keyword. For example, generic or commonly used words such as 'The' would have a higher generic index whereas non-generic words such as 'laser' would have a lower generic index. It should be noted that a higher generic index does not necessarily mean a higher numeric value when the generic index is represented in terms of numeric values. The concept of lower and higher has been used essentially to show that the two types of keywords may be represented on a numerical scale, on one end of which would be very generic words, e.g. 'the', whose generic index may be set to 0, while on the other end there could be highly specific words, e.g. 'laser' whose numeric value may be far greater than 0. In an embodiment, the generic index may be obtained from a look-up table. In another embodiment, the generic index may be calculated on the basis of occurrence of keywords in different classification codes such as patent classification code, technology classification codes, journal classification code etc. This means that the generic index of the same keyword may be different for patents related to different technologies. For example, the generic index of the keyword 'antenna' may be higher in a patent class that contains all patent related with antenna technology.

Other enhanced query parameters may be given equal or different weightages while evaluating, and thereafter assigning the score. For example, classification codes present in an enhanced query may be evaluated to determine how many classification codes in the input query match with classification codes present in a document. Based on the number of matches of the classification code, the scoring algorithm may assign the score to the one or more returned documents that are determined as relevant. In the same manner, the scoring algorithm may consider other enhanced query parameter such as time period, assignees, inventors, and authors for assigning the score.

Figure 4:
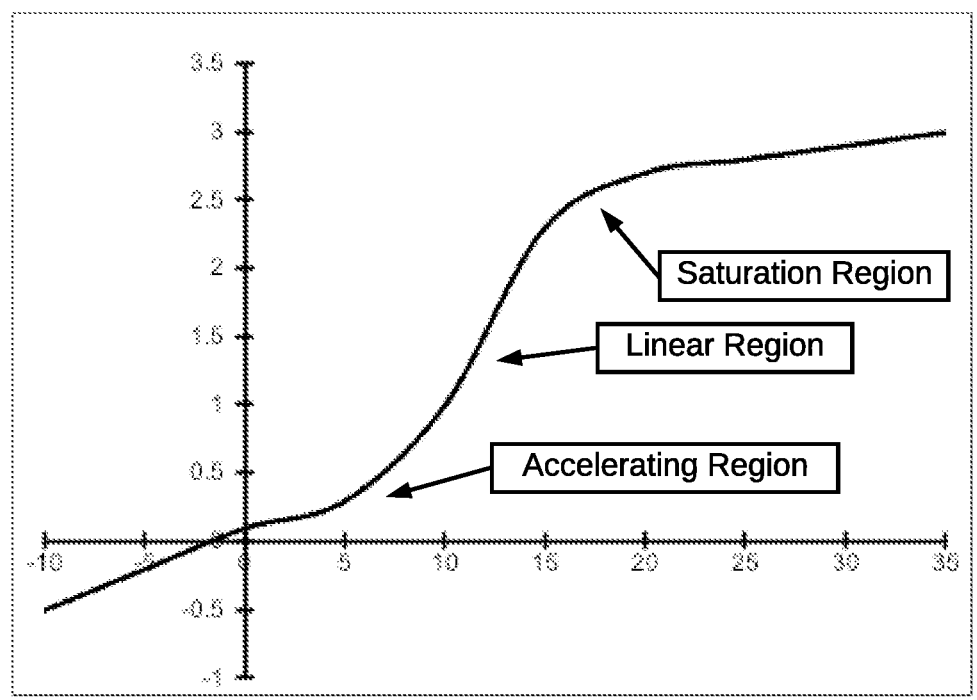
FIG. 4 is a block diagram illustrating the scoring function associated with the scoring algorithm, in accordance with an embodiment.

FIG. 4 is a diagram illustrating the scoring function associated with the scoring algorithm, in accordance with an embodiment. The scoring algorithm may consider one or more enhanced query parameters for evaluating the degree to which the enhanced query parameters are matched in the one or more returned documents that are determined as relevant before assigning a score to a document. This has already been explained in conjunction with FIG. 3. In an embodiment, the scoring algorithm may assign the score using a scoring function. The scoring function's curve is S-shaped and represents the function between the score and the term frequency as illustrated in FIG. 4. As can be seen in FIG. 4, the curve has an accelerating region, a linear region and a saturation region. The curve may be represented by equation (1), wherein A, B, and C are constants and N is the term frequency.

$$\text{Scoring Function}=A+\tan^{-1}((N/B)-C) \qquad (1)$$

The scoring function helps in lowering the score of documents that merely mention the enhanced query terms and in increasing the score of documents that actually talk-about (or focus-on) the enhanced query terms. For example, let's say that the user is interested in patent documents talking about power control ranging from applications in mobile devices to applications in automobile engines. Assume that the user enters the following query, 'Power Control', which has two terms—'Power' and 'Control'. Also, further assume that there are three documents stored in the database with terms frequencies for search term 'Power' and search term 'Control' as illustrated in FIG. 6b. Based on the conventional term frequencies scoring schemes, document D1 will get a term frequency score of 102, document D2 will get a term frequency score of 101, and document D3 will get a term frequency score of 60. However, as can be observed from FIG. 6b, D3 is likely to be more relevant than D1 and D2 because it gives a more balanced focus to both terms of the input query. However, in the conventional term frequency score based approach, the score of D3 is shadowed by D1 and D2, which are, in fact, likely to be less relevant than D3 since, on one hand a lot of patents describing 'power' mention the term 'control', and on the other hand there would be a lot of patents using the term 'control', as it is a generic and a very broad term and have mention of the term 'power' somewhere in the text of the document. It can be envisioned that the generic index scheme can be combined with this scoring function, in which the scores for different keywords may be multiplied (or divided, depending on whether the numerical generic score of the keywords decreases or increases with how generic the keyword is) with their generic scores.

The scoring function overcomes the limitations of the conventional term frequency score based approach by assigning a lesser score to patents that merely mention the terms at one or more places, as well as keeping patents using one of the terms a large number of times from overshadowing relevant patents. The scoring function achieves this objective by effectively rejecting the patents that contain mere mention of the search terms and simultaneously also capping the amount by which a term affects the overall score of the document. In the initial region and the saturation region of the scoring function, the additional score provided for new term occurrence is lesser than that that provided in the linear region. An example of working of the three regions of the scoring function is illustrated in FIG. 6c. The scoring behavior illustrated in FIG. 6C may be simulated using a function represented in equation 2.

$$S_i = A + \tan^{-1}\left(\frac{n_i}{B} - C\right) \quad (2)$$

where A, B, and C are constants, $n_i$ is the term frequency of the i-th term in the query, and $S_i$ is the score assigned to a document due to the i-th term in the query. In an embodiment, the constants may be given the following values as shown in equation 3 for getting a good score and proper working of the scoring function.

$$S_i = 1.3 + \tan^{-1}\left(\frac{n_i}{\pi} - \pi\right) \quad (3)$$

In an embodiment, the terms could be weighted, for example, using the well-known df-idf scheme, or as mentioned above, with a generic index. In such a case, the term scoring would be changed by multiplying with a weighting factor as shown in equation 4.

$$S_i = w_i\left(1.3 + \tan^{-1}\left(\frac{n_i}{\pi} - \pi\right)\right) \quad (4)$$

The final score of the document would be calculated by adding the individual score of all query terms as shown in equation 5.

$$S = \Sigma_i Si \quad (5)$$

Even with such a scoring, relevant but shorter documents could be overshadowed by longer but less relevant documents. To compensate for this, the score could be calculated as shown in equation 6.

$$S = \frac{L_{avg}}{L}\sum_i Si \quad (6)$$

In equation 6, $L_{avg}$ denotes the average length of the document (in the document collection) and L denotes the length of the document being scored. The length may be measured, for example, in terms of number of words.

Figure 5:
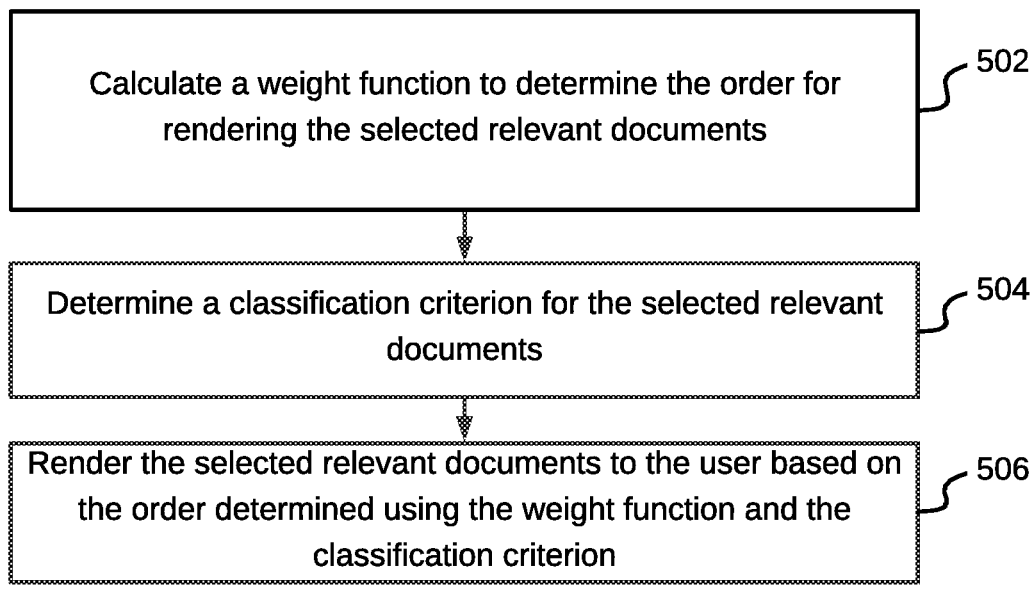
FIG. 5 illustrates a flowchart of a method for rendering selected relevant documents to a user, in accordance with an embodiment.

FIG. 5 illustrates a flowchart of a method for rendering selected relevant documents to a user, in accordance with an embodiment. Based on the assigned score, the processor selects relevant documents from the one or more returned documents that are determined as relevant. This has already been explained in conjunction with FIG. 2. After the relevant documents are selected by the processor, the processor renders the relevant documents to the user. In order to determine the order for rendering the relevant documents, initially at step 502, the processor calculates a weight function. The weight function may be calculated based on the components of the enhanced query, number of documents in the network servers or databases satisfying the enhanced query components, and/or parameters supplied by the user. In an embodiment, the assignment of the weight may be based on the type of enhanced query component. The weight assigned to each component may be fixed, or input by the user, or calculated, at least partially, on the basis of the number of documents satisfying the enhanced query. In another embodiment, the weight is assigned based on the number of documents in the network servers or databases satisfying the enhanced query component. In yet another embodiment, the weight is assigned based on the parameters supplied by the user. Examples of the parameters supplied by the user include, but are not limited to keywords, classification codes, number of inventors, number of fields, length of text in a document section, and number of text characters in a document section.

Thereafter, at step 504, the processor determines a classification criterion for the selected relevant documents. The classification criterion may be based on factors such as, but not limited to, classification codes, keywords, assignees, inventors, time period, publication date, and date of receiving the document. The classification criterion may be specified by the user as fixed or flexible based on the enhanced query that is input for execution. Alternatively, the classification criterion could be auto-determined based on historical data, machine learning algorithms, and set of rules specified by the user. Once the classification criterion is determined for the selected relevant documents, at step 506, the processor renders the selected relevant documents to the user based on the order determined using the weight function and the classification criterion. The selected relevant documents are rendered through a GUI of the workstation associated with the user.

FIG. 6 illustrates a flowchart of a method for displaying a visual map associated with the rendered relevant documents to the user, in accordance with an embodiment. Initially, at step 602, the processor selects the relevant documents from the one or more returned documents that are determined as relevant based on the assigned score. Thereafter, at step 604, the processor renders the relevant documents to the user in an order which is determined based on the weight function and the classification criterion. This has already been explained in conjunction with FIG. 5. In response to rendering the relevant document, at step 606, a visual map is displayed to the user for the rendered relevant documents in order to assist the user in analyzing the contents of the rendered relevant document. The visual map includes multiple components that are placed on the map for improving the user experience when interacting with a rendered relevant document. For example, the visual map may include a location component associated with the enhanced keywords present in the rendered relevant document, a color component associated with the enhanced keywords present in the rendered relevant document, a section component associated with the rendered relevant document, a paragraph component associated with the rendered relevant document, and a key text portion component associated with the rendered relevant document.

The location component aids in identifying the location of the keywords that are likely to be of interest to the user within the rendered relevant document. The user may choose to quickly scroll to the locations identified by these location component aids to first read those sections of the document that are carrying these keywords. The keywords whose location within the rendered relevant documents are shown to the user are selected based on user inputs or extracted automatically from the input query or the enhanced query. The color component aids in differentiating between the keywords within the rendered relevant documents by displaying the keywords in different colors. In an embodiment, a keyword and its synonyms are displayed in the same color. Further, the synonyms for a keyword may be entered manually by the user or may be extracted automatically from a look-up table, or a vector-space model of keywords. In another embodiment, each synonym of a keyword may be assigned a weight based on which a parameter of the color used for showing the location of a synonym within the rendered relevant document may be varied. In yet another embodiment, the colors are selected manually by the user or automatically assigned by the processor from a set of stored colors.

The section component aids in identifying the various sections within a rendered relevant document. Examples of the sections include Title, Abstract, Claims, Specification, Summary, Background, and Figures. This helps the user in focusing on only those sections for analysis which are of importance to the user. In the same manner, the paragraph component aids in differentiating amongst the various paragraphs present within the rendered relevant document. The key-text portion component also aids in analyzing the rendered relevant document is an efficient manner. The key-text portion matches a query term or a combination of query terms which is input manually by the user, wherein the query term may be same or different from the enhanced query terms input by the user to retrieve relevant documents. This query may also specify the relative arrangement of these query terms, e.g. (laser NEAR/5 power) means that only those text portions are considered as key-text portions in which the keywords 'laser' and 'power' are present within a span of 5 words. It can be envisioned that while selecting the key-text portions, synonyms may also be considered, e.g. if the query supplied by the user for key-text identification is (laser NEAR/5 power), then a text portion 'energy rating of the laser' may also qualify as key-text portion, because 'energy' may be synonym for 'power'. As described above, these synonyms may be manually supplied by the user or determined automatically by algorithms well known in the literature (e.g. word2vec). Further, the key-text portion may be used to describe a most important section, crux, or conclusion of the document in which case a query for the same may or may not be required from the user. Queries for identifying such sections may be in-built into the system or may be supplied by the user. As an example, the last paragraph in a document mentioning the keyword 'conclusion' or its semantic variations or its synonyms may be identified as a key-text portion. Similarly, any paragraph specifying the exemplary query ((previous OR prior) NEAR/10 (disadvantage OR problem)) may be identified as a key-text portion. Obviously, more sophisticated approaches, as described elsewhere in the current description, can be used to identify these key-text portions, and the above examples are meant only to convey the basic idea.

In the same manner, the visual map may also include other components such as a score component associated with the rendered relevant document, and a key insight component associated with the rendered relevant document. The key insight component may highlight important information about the rendered relevant document. For example, the key insight may correspond to an assignee of the document, wherein the assignee is among a list or a subsidiary of assignees entered manually by the user or the assignee is the list of top 'n' assignees in a set of manually selected documents' assignees or the returned documents' assignees. In an embodiment, the key insight component may also correspond to one or more classification codes of the rendered relevant document, and a key phrase in the rendered relevant document text. In another embodiment, the key insight component may correspond to inventors of the document who have a large number of publications in a given technical domain, wherein the domain may be categorized by a classification code, or one or more keywords. In the same manner, the inventors of the document may be highlighted in the key insight portion where the inventors are associated with a standardization organization.

Figure 7:
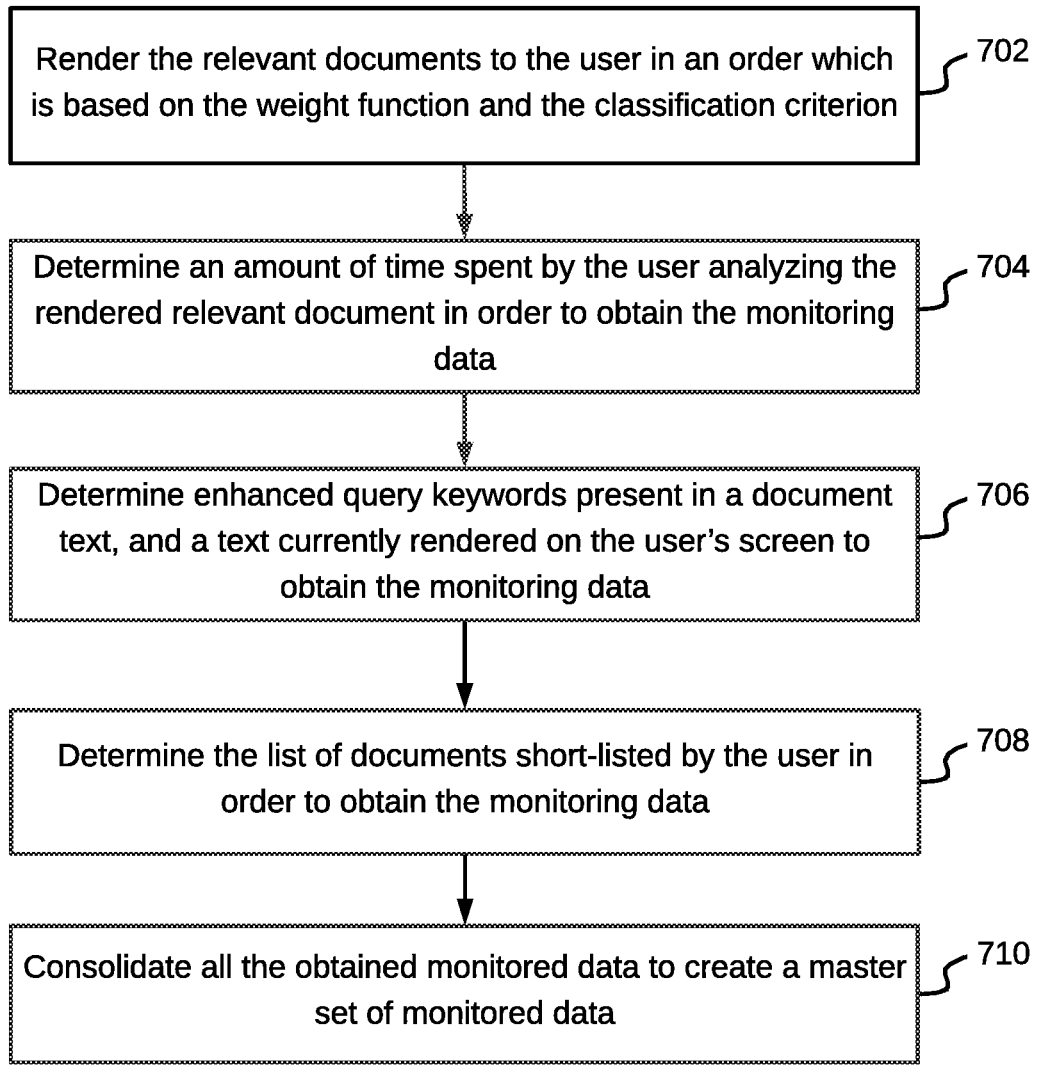
FIG. 7 illustrates a flowchart of a method for obtaining monitoring data associated with the user's interaction with the rendered relevant document, in accordance with an embodiment.

FIG. 7 illustrates a flowchart of a method for obtaining monitoring data associated with the user's interaction with the rendered relevant document, in accordance with an embodiment. Initially, at step 702, the processor renders relevant document to the user so that the user can analyze the rendered relevant document. In response to the user accessing the rendered relevant document, the processor, at step 704, determines an amount of time spent by the user analyzing the rendered relevant document in order to obtain the monitoring data. In an embodiment, the amount of time spent analyzing specific sections within the rendered relevant document may also be determined. For example, the amount of time analyzing a document text, a document section, and a document image may also be monitored. In another embodiment, the processor may determine the keywords present in the document text, the keywords in the text currently rendered on the screen, or a combination of the keywords. For example, the processor may determine a pair of keywords that are currently rendered on the screen, keywords that appear together in a document. By correlating the keywords in the text of the document or the portion of the text rendered on the screen and the time spent by the user analyzing the document or the portion of the document rendered on the screen, the processor may monitor and record correlation information regarding the time spent the user and the keywords in the corresponding text. This correlation information may be used to identify keywords that may be of interesting to the user but were not part of the input query and/or the enhanced query. Alternatively, the relative relevance of the keywords that were part of the input query or the enhanced query may be determined on the basis of this correlation information. Thereafter, at step 706, the processor determines enhanced query keywords present in a document text, and a text currently rendered on the user's screen to obtain the monitoring data. At step 708, the processor determines the list of documents short-listed by the user in order to obtain the monitoring data. Finally, at step 710, the processor consolidates all the obtained monitored data from the previous steps to create a master set of monitored data associated with the user.

Figure 8:
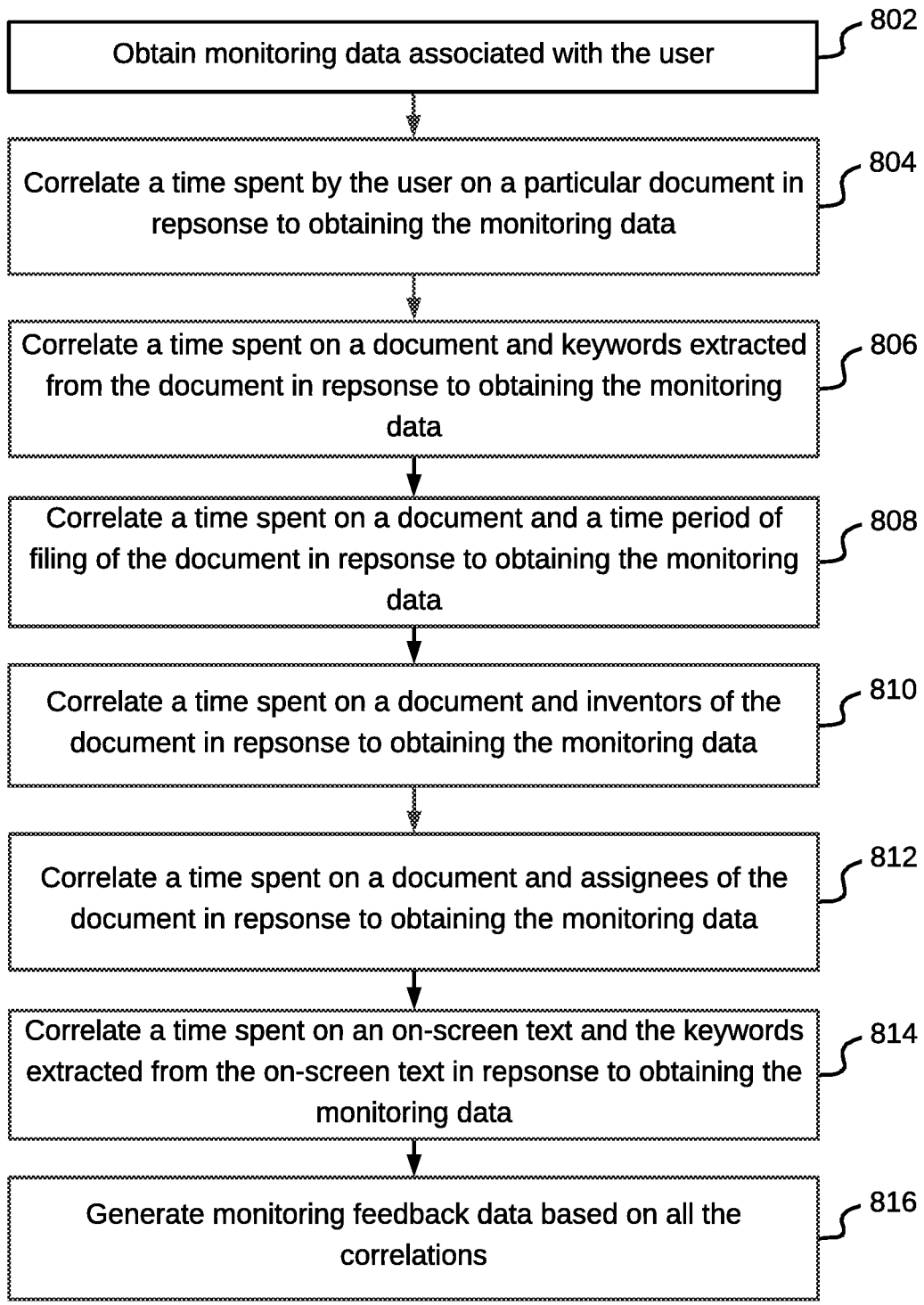
FIG. 8 illustrates a flowchart of a method for generating monitoring feedback data based on the obtained monitoring data, in accordance with an embodiment.

FIG. 8 illustrates a flowchart of a method for generating monitoring feedback data based on the obtained monitoring data, in accordance with an embodiment. As explained in conjunction with FIG. 7, the manual analysis performed by the user on the rendered relevant document may be monitored to obtain monitoring data. Thus, at step 802, the monitoring data associated with the user is obtained by the processor. Thereafter, based on the obtained monitoring data, the processor, at step 804, correlates a time spent by the user on a particular document or a particular section of the document. At step 806, the processor correlates a time spent on a document and keywords extracted from the document. Thereafter, at step 808, the processor correlates a time spent on a document and a time period of filing of the document. At step 810, the processor correlates a time spent on a document and inventors of the document. Similarly, at step 812, the processor correlates a time spent on a document and assignees of the document. Thereafter, at step 814, the processor correlates a time spent on an on-screen text and the keywords extracted from the on-screen text. Finally, at step 816, in response to performing the correlations, the processor generates the monitoring feedback data. The monitoring feedback data includes, but is not limited to, a list of keywords, a list of classes, a list of inventors, a list of assignees, and a list of anchor-citation points. In an embodiment, each keyword in the list of keywords may be associated with a weight. In the same manner, each class in the list of classes may be associated with a weight. The weight may be computed automatically by the processor. Alternatively, the weight may be determined based on a look-up table, or a set of rules specified by the user. It will be evident to a person skilled in the art that the steps of correlation may also be performed either independently or parallelly for generating the monitoring feedback data. In the same manner, in an embodiment, some of the steps may be omitted or the order of execution of the steps may be modified, wherein some steps may be performed either before, after, or along with other steps.

Figure 9:
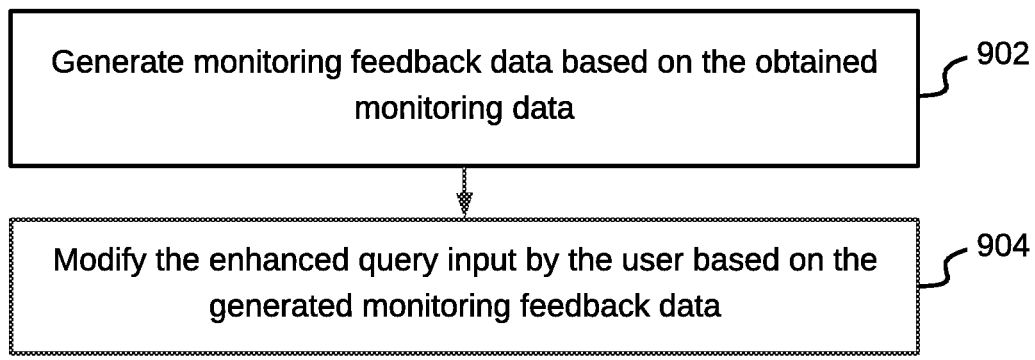
FIG. 9 illustrates a flowchart of a method for modifying the query input by the user based on the monitoring feedback data, in accordance with an embodiment.

FIG. 9 illustrates a flowchart of a method for modifying the enhanced query input by the user based on the monitoring feedback data, in accordance with an embodiment. Initially, at step 902, the processor generates the monitoring feedback data based on the obtained monitoring data associated with the manual analysis performed by the user on the rendered relevant document. Thereafter, at step 904, the processor modifies the enhanced query input by the user by adding or removing equivalent search terms, also referred herein as synonyms (the synonyms may not always be direct, linguistic synonyms for the keyword and may only be related in some meaningful sense to the keywords in the input query), by adding or removing classification codes for one or more keywords, by adding or removing disambiguation for one or more keywords, by adding or removing a semantic specification for one or more keywords, by adding or removing a weight associated with one or more keywords, adding or removing a weight associated with one or more classifications, adding or removing a truncation function added for one or more keywords, by adding or removing an inventor name, by adding or removing an assignee name, and/or by adding or removing one or more anchor citation points. In an embodiment, the query components are added when their associated weight is greater than a first threshold and the query components are removed when their associated weight is lesser than a second threshold. The first threshold and the second threshold may be computed automatically by the processor, or specified manually by the user. The modified enhanced query may then be used by the user to rerun the searches to retrieved additional set of relevant documents. Alternatively, the user may choose not to rerun the searches after reviewing the modified enhanced query.

Figure 10:
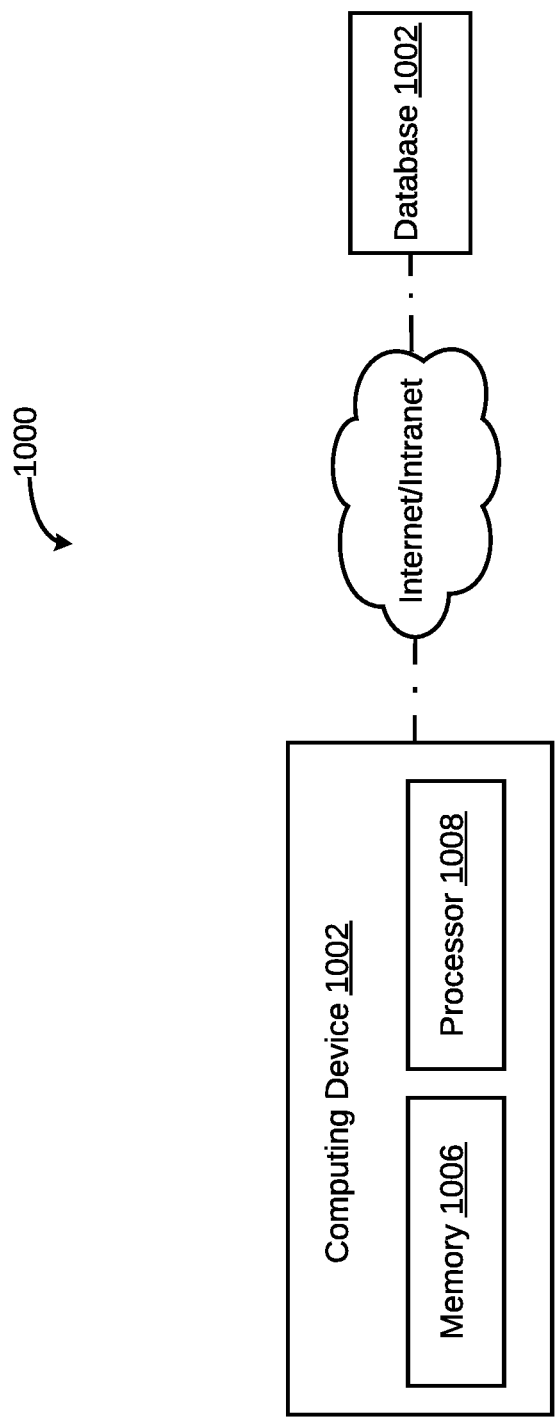
FIG. 10 illustrates a system 1000 for retrieving relevant documents, in accordance with an embodiment.

FIG. 10 illustrates a system 1000 for retrieving relevant documents, in accordance with an embodiment. System 1000 includes a database 1002, and a computing device 1004 which is operatively coupled with database 1002. Computing device 1004 includes a memory 1006 and a processor 1008. Database 1002 is configured to store a plurality of documents, wherein the plurality of documents may be of different type, size, and format. A user associated with computing device 1004 may retrieve documents from database 1002 by running one or more queries on computing device 1004. Initially, the user inputs a query using a GUI associated with the workstation of the user. The input query may comprise one or more parameters that are input by the user to capture the relevant documents. Examples of the one or more parameters include, but are not limited to, one or more keywords, classification codes, time period, assignees, inventors, authors, and document section properties.

In order to retrieve relevant documents from database 1002 and avoid any possible noise in the result set, processor 1008 is configured to enhance the input query provided by the user so that only relevant documents are rendered for further analysis by the user. Thus, when a query is input by the user, processor 1208 is configured to generate an enhanced query by modifying the input query using one or more approaches. This has already been explained in detail in conjunction with FIG. 1. Processor 1008 analyzes the enhanced query to determine relevancy of a document from the plurality of documents present in database 1002. The documents that are determined as relevant are tagged by processor 1008 so that they can be returned as output of running the enhanced query.

Once the relevancy is determined, processor 1008 assigns a score to one or more documents that are returned in response to running the enhanced query. The score is assigned to the one or more returned documents that are determined as relevant by using a scoring algorithm which resides in processor 1008. The scoring algorithm evaluates a degree to which the enhanced query parameters are matched in the one or more returned documents that are determined as relevant. The enhanced query parameters that are considered for evaluating the degree may include, but are not limited to keywords, a field of search, a term frequency, a generic index, classification codes, time period, assignees, inventors, authors, and section properties associated with the returned documents that are determined as relevant.

For example, the scoring algorithm may evaluate fields in a document where the keywords appear for assigning the score. The assigned score may vary based on the fields where the keywords appear or may be fixed irrespective of the fields where the keywords appear. The score for different fields may be set by the user or maybe automatically determined by the scoring algorithm. In the same manner, the assigned score may depend on term frequency where the number of times a keyword appears in the document determines the score that will be assigned to a document. In an embodiment, the score may saturate after a given threshold term frequency, wherein the score would not increase beyond a certain point. In another embodiment, the score may be set by a scoring function residing in processor 1008 and associated with the scoring algorithm. The scoring function represents a function between the score and the term frequency. The scoring function's curve is S-shaped and has already been explained in detail in conjunction with FIG. 4.

Processor 1008 may also utilize a generic index for evaluating the degree to which the enhanced query parameters are matched in the documents. The generic index is related to the keywords which are present in the enhanced query. The generic index is a measure of how generic is the keyword. For example, generic or commonly used words such as 'The' would have a higher generic index whereas non-generic words such as 'laser' would have a lower generic index. In an embodiment, the generic index may be obtained by processor 1008 from a look-up table residing in database 1002. In another embodiment, the generic index may be calculated by processor 1008 on the basis of occurrence of keywords in different classification codes such as patent classification code, technology classification codes, journal classification code etc.

Other enhanced query parameters may be given equal or different weightages by processor 1008 while evaluating, and thereafter assigning the score. For example, classification codes present in an enhanced query may be evaluated by processor 1008 to determine how many classification codes in the input query match with classification codes present in a document. Based on the number of matches of the classification code, the scoring algorithm may assign the score to the one or more returned documents that are determined as relevant. In the same manner, the scoring algorithm may consider other enhanced query parameter such as time period, assignees, inventors, and authors for assigning the score.

In response to assignment of the score by processor 1008 to the one or more returned documents that are determined as relevant, processor 1008 proceeds to select refined set of relevant documents based on whether the assigned score fulfills one or more predetermined criteria. The one or more predetermined criteria could be specified by the user before the enhanced query is run or specified by the user after running the enhanced query. Alternatively, the one or more predetermined criteria could be automatically generated by processor 1008 based on the enhanced query and/or based on the one or more returned documents that are determined as relevant. Examples of the one or more predetermined criteria may include, but are not limited to threshold calculation, weights, and domain of search. Thus, at first, processor 1008 determines whether the assigned score is greater than a given threshold. If the assigned score is greater than the given threshold, processor 1008 selects relevant documents from the one more returned documents that are determined as relevant. In an embodiment, processor 1008 may determine whether the assigned score is greater than score of a given fraction of scored documents and select relevant documents from the one or more returned documents that are determined as relevant. The given fraction of score documents may be specified by the user or automatically selected by processor 1008. If the assigned score is greater than the score of the given fraction of documents, then processor 1008 selects relevant documents from the one or more relevant documents that are determined as relevant.

After the relevant documents are selected, processor 1008 renders the relevant documents to the user on a GUI associated with computing device 1004. In order to determine the order for rendering the relevant documents, initially processor 1008 calculates a weight function. The weight function may be calculated based on the components of the enhanced query, number of documents in database 1002 satisfying the enhanced query components, and/or parameters supplied by the user. In an embodiment, the assignment of the weight may be based on the type of enhanced query component. The weight assigned to each component may be fixed, or input by the user, or calculated, at least partially, on the basis of the number of documents satisfying the enhanced query. In another embodiment, the weight is assigned by processor 1008 based on the number of documents in database 1002 satisfying the enhanced query component. In yet another embodiment, the weight is assigned by processor 1008 based on the parameters supplied by the user. Examples of the parameters supplied by the user include, but are not limited to keywords, classification codes, number of inventors, number of fields, length of text in a document section, and number of text characters in a document section.

Thereafter, processor 1008 determines a classification criterion for the selected relevant documents. The classification criterion may be based on factors such as, but not limited to, classification codes, keywords, assignees, inventors, time period, publication date, and date of receiving the document. The classification criterion may be specified by the user as fixed or flexible based on the enhanced query that is input for execution. Alternatively, the classification criterion could be auto-determined by processor 1008 based on historical data, machine learning algorithms, and set of rules specified by the user. Once the classification criterion is determined for the selected relevant documents, processor 1008 renders the selected relevant documents to the user based on the order determined using the weight function and the classification criterion. The selected relevant documents are rendered through the GUI of computing device 1004 associated with the user.

Once the relevant documents are rendered by processor 1008 to the user, a visual map is displayed to the user for the rendered relevant documents on the GUI associated with computing device 1004. The visual map is displayed to assist the user in analyzing the rendered relevant document. The visual map includes multiple components that are placed on the map for improving the user experience when interacting with a rendered relevant document. For example, the visual map may include a location component associated with the enhanced keywords present in the rendered relevant document, a color component associated with the enhanced keywords present in the rendered relevant document, a section component associated with the rendered relevant document, a paragraph component associated with the rendered relevant document, and a key text portion component associated with the rendered relevant document.

The location component aids in identifying the location of the keywords present in the enhanced query within the rendered relevant document. The keywords whose location within the rendered relevant documents are shown to the user are selected based on user inputs or extracted automatically from the input query or the enhanced query by processor 1008. The color component aids in differentiating between the keywords within the rendered relevant documents by displaying the keywords in different colors. In an embodiment, a keyword and its synonyms are displayed in the same color. Further, the synonyms for a keyword may be entered manually by the user or may be extracted automatically by processor 1008 from a look-up table stored in database 1002 or stored in computing device 1004, or a vector-space model of keywords stored in database 1002 or stored in computing device 1004. In another embodiment, each synonym of a keyword may be assigned a weight by processor 1008 based on which a parameter of the color used for showing the location of a synonym within the rendered relevant document may be varied. In yet another embodiment, the colors are selected manually by the user or automatically assigned by processor 1008 from a set of stored colors.

The section component aids in identifying the various sections within a rendered relevant document. Examples of the sections include Title, Abstract, Claims, Specification, Summary, Background, and Figures. This helps the user in focusing on only those sections for analysis which are of importance to the user. In the same manner, the paragraph component aids in differentiating amongst the various paragraphs present within the rendered relevant document. The key-text portion component also aids in analyzing the rendered relevant document is an efficient manner. The key-text portion matches a query term which is input manually by the user, wherein the query term may be same or different from the enhanced query terms. Further, the key-text portion may be used to describe a most important section, crux, or conclusion of the document.

In the same manner, the visual map may also include other components such as a score component associated with the rendered relevant document, and a key insight component associated with the rendered relevant document. The key insight component may highlight important information about the rendered relevant document. For example, the key insight may correspond to an assignee of the document, wherein the assignee is among a list or a subsidiary of assignees entered manually by the user or the assignee is the list of top 'n' assignees in a set of manually selected documents' assignees or the returned documents' assignees. In an embodiment, the key insight component may also correspond to one or more classification codes of the rendered relevant document, and a key phrase in the rendered relevant document text. In another embodiment, the key insight component may correspond to inventors of the document who have a large number of publications in a given technical domain, wherein the domain may be categorized by a classification code, or one or more keywords. In the same manner, the inventors of the document may be highlighted in the key insight portion where the inventors are associated with a standardization organization.

Based on the analysis performed by the user using the visual map on the rendered relevant document, processor 1008 may obtain monitoring data, wherein the monitoring data is associated with the user's interaction with the rendered relevant document. In order to obtain the monitoring data, processor 1008 determines an amount of time spent by the user in analyzing the rendered relevant document. In an embodiment, the amount of time spent analyzing specific sections within the rendered relevant document may also be determined by processor 1008. For example, the amount of time analyzing a document text, a document section, and a document image may also be monitored by processor 1008. In another embodiment, processor 1008 may determine the keywords present in the document text, the keywords in the text currently rendered on the screen, or a combination of the keywords. For example, processor 1008 may determine a pair of keywords that are currently rendered on the screen, keywords that appear together in a document.

Thereafter, processor 1008 determines enhanced query keywords present in a document text, and a text currently rendered on the user's screen to obtain the monitoring data. Processor 1008 also determines the list of documents shortlisted by the user in order to obtain the monitoring data. Finally, processor 1008 consolidates all the obtained monitored data from the previous steps to create a master set of monitored data associated with the user.

After obtaining the monitoring data, processor 1008 generates monitoring feedback data based on the obtained monitoring data. Initially. processor 1008 correlates a time spent by the user on a particular document or a particular section of the document. Thereafter, processor 1008 correlates a time spent on a document and keywords extracted from the document. Processor 1008 also correlates a time spent on a document and a time period of filing of the document. Processor 1008 may correlate a time spent on a document and inventors of the document. The time spent on a document and assignees of the document may also be correlated by processor 1008. In the same manner, processor 1008 correlates a time spent on an on-screen text and the keywords extracted from the on-screen text.

Finally, in response to performing the correlations, processor 1008 generates the monitoring feedback data. The monitoring feedback data includes, but is not limited to, a list of keywords, a list of classes, a list of inventors, a list of assignees, and a list of anchor-citation points. In an embodiment, each keyword in the list of keywords may be associated with a weight. In the same manner, each class in the list of classes may be associated with a weight. The weight may be computed automatically by processor 1008. Alternatively, the weight may be determined by processor 1008 based on a look-up table, or a set of rules specified by the user. It will be evident to a person skilled in the art that the steps of correlation may be performed either serially or in parallel by processor 1008 for generating the monitoring feedback data.

In response to generating the monitoring feedback data, processor 1008 may then modify the enhanced query input by the user to generate a modified enhanced query. Processor 1008 may modify the enhanced query by adding or removing synonyms for one or more keywords, by adding or removing classification codes for one or more keywords, by adding or removing disambiguation for one or more keywords, by adding or removing a semantic specification for one or more keywords, by adding or removing a weight associated with one or more keywords, adding or removing a weight associated with one or more classifications, adding or removing a truncation function added for one or more keywords, by adding or removing an inventor name, by adding or removing an assignee name, and/or by adding or removing one or more anchor citation points. In an embodiment, the query components are added when their associated weight is greater than a first threshold and the query components are removed when their associated weight is lesser than a second threshold. The first threshold and the second threshold may be computed automatically by processor 1008, or specified manually by the user. The modified enhanced query may then be used by the user to rerun the searches to retrieved additional set of relevant documents. Alternatively, the user may choose not to rerun the searches after reviewing the modified enhanced query.

An exemplary embodiment to retrieve relevant patent documents from a database with references to FIG. 1 through FIG. 11 is now described. Let us assume that a user wishes to retrieve patent documents that describe the concept of a 'cap that helps in keeping a pen nib dry'. Initially, the user may input a query that is aimed at capturing the concept of a 'cap that helps in keeping a pen nib dry'. The user may enter search terms: (PEN NIB CAP DRY) to identify relevant patent documents from the database. The user may also enter one or more classification codes, and one or more date restrictions in addition to the keywords as part of the input query. After entering the input query, the processor enhances the input query to produce an enhanced query. The enhanced query is a set of parameters or components on the basis of which relevancy of a document could be determined. This has already been explained in detail in conjunction with FIG. 2.

Thus, the enhanced query may include synonyms for some of the query terms such as PEN and NIB in the present case. Therefore, the initial query is modified to produce the enhanced query: (PEN OR 'WRITING INSTRUMENT' OR 'WRITING DEVICE') AND (NIBS OR 'WRITING POINT' OR 'BALL POINT'). As already explained in conjunction with FIG. 2, the synonyms could be obtained from a look-up table, which is generated either manually or automatically through a process separate from the process of receiving input query from the user. Further, the enhanced query may also include classes for some of the terms. For example, the classes for PEN and NIB may be added: (PEN OR CLASS: B43K5/00) AND (NIB OR CLASS: B43K1/00). The classes may be selected from a look-up table that is generated manually or automatically through term-class concordance, as is well known in the art. The enhanced query may also include disambiguation, semantic specification, and document identification codes. In an embodiment, the enhanced query may also include weights for the terms, which may be input manually by the user or determined using a look-up table. Further, the enhancement may also include automatically adding truncations, and anchor citation points. This has already been explained in detail in conjunction with FIG. 2.

After the enhanced query is generated, the processor runs the enhanced query in the database and selects one or more patent documents. A patent document may be selected on the basis of whether the patent document satisfies all the enhanced query parameters or whether the patent document satisfies at least a threshold fraction of the enhanced query component. After the one or more patent documents are selected, a score is assigned to the documents by the scoring algorithm. The scoring algorithm assigns a score to the patent documents based on search keywords, term frequency of the keywords, patent classification codes, time period, assignees, and inventors. The operation of the scoring algorithm has already been explained in detail in conjunction with FIG. 3 and FIG. 4.

Further, the scoring algorithm may also consider additional factors such as claim properties of a patent document while assigning the score. The claim properties of a patent document may be determined based on length of independent claims, and number of clauses in the independent claims. In an embodiment, the length may correspond to average length of the independent claims, length of the shortest independent claim, or length of the longest independent claim. Further, the number of clauses in the independent claims may correspond to one or more of average number of clauses, greatest number of clauses in any independent claim, or smallest number of clauses in any independent claim. The claim properties could also be determined based on factors such as, but not limited to, number of dependent claims, average number of dependent claims per independent claim, largest number of dependent claims for any independent claim, and number of independent claims.

While assigning the score, the scoring algorithm may recursively retrieve forward and backward citing patent documents from one or more 'anchor patent documents'. The anchor patent documents correspond to those documents whose document identification codes (patent numbers) are present in the enhanced query or may correspond to those documents that are selected from the citations of any 'anchor patent document' that satisfies one or more predetermined conditions. In an embodiment, the one or more predetermined conditions may correspond to the patent document having a greatest score among all the retrieved patent documents, the score of the patent document is higher than a given threshold, or is greater than the score of a given fraction of scored documents, the number of citations of the patent document is greater than zero but less than a predetermined threshold, or the fraction of citations of the patent document that are cited by a patent examiner is greater than a fixed fraction of the total citations of the patent document.

Once the patent documents are selected based on the assigned score, the selected patent documents are rendered to the user. The selected patent documents are sorted based on the enhanced query components, or based on parameters supplied by the user. This has already been explained in detail in conjunction with FIG. 5. The selected patent documents are classified on the basis of patent classification codes, keywords, patent assignees, inventors, and time periods of priority, filing, or publication. The user may be assisted in analyzing a currently rendered patent document by displaying a visual map of the patent document text. This has already been explained in detail in conjunction with FIG. 6. In addition to the various sections and key insights already explained in conjunction with FIG. 6 for a patent document that are displayed on the visual map, additional information such as a Standard Essential Patent (SEP) status of the patent document may also be highlighted.

Further, information related to divisional application of the patent document with different text than the currently rendered patent document, a time period of the priority or filing of the patent document may also be provided on the visual map. In an embodiment, information about non-patent literature documents that are similar to the currently rendered patent document may also be delivered through the visual map. The non-patent literature documents may be an industry standard, an industry standard draft or change request, a news article, a blog, a technological review paper, a research paper, or a product manual. The similarity of the non-patent literature document may be determined on the basis of factors such as inventors, assignees, time period of publication of the non-patent literature document, keywords, a look-up table, which may be generated in real-time or may be static, or any combination of the factors.

Once the patent document is rendered to the user, the interaction of the user with the patent document may be monitored to obtain monitoring data. This has already been explained in detail in conjunction with FIG. 7. Based on the obtained monitoring data, a monitoring feedback data is generated. The monitoring feedback data may include, but are not limited to, a list of keywords, a list of patent classifications, a list of inventors, a list of assignees, and anchor-citation points. This has already been explained in detail in conjunction with FIG. 8. The monitoring feedback data is then used to modify the enhanced query to generate modified enhanced query. The modified enhanced query may be generated by adding or removing enhanced query components such as keywords, or patent classification codes, modifying the weights of the enhanced query components, and by adding or removing anchor-citation points. The modified enhanced query may then be used by the user for re-running the query to retrieve additional patent documents in the event where the user is not satisfied with the initial returned set of patent documents. This has already been explained in detail in conjunction with FIG. 9.

Figure 11:
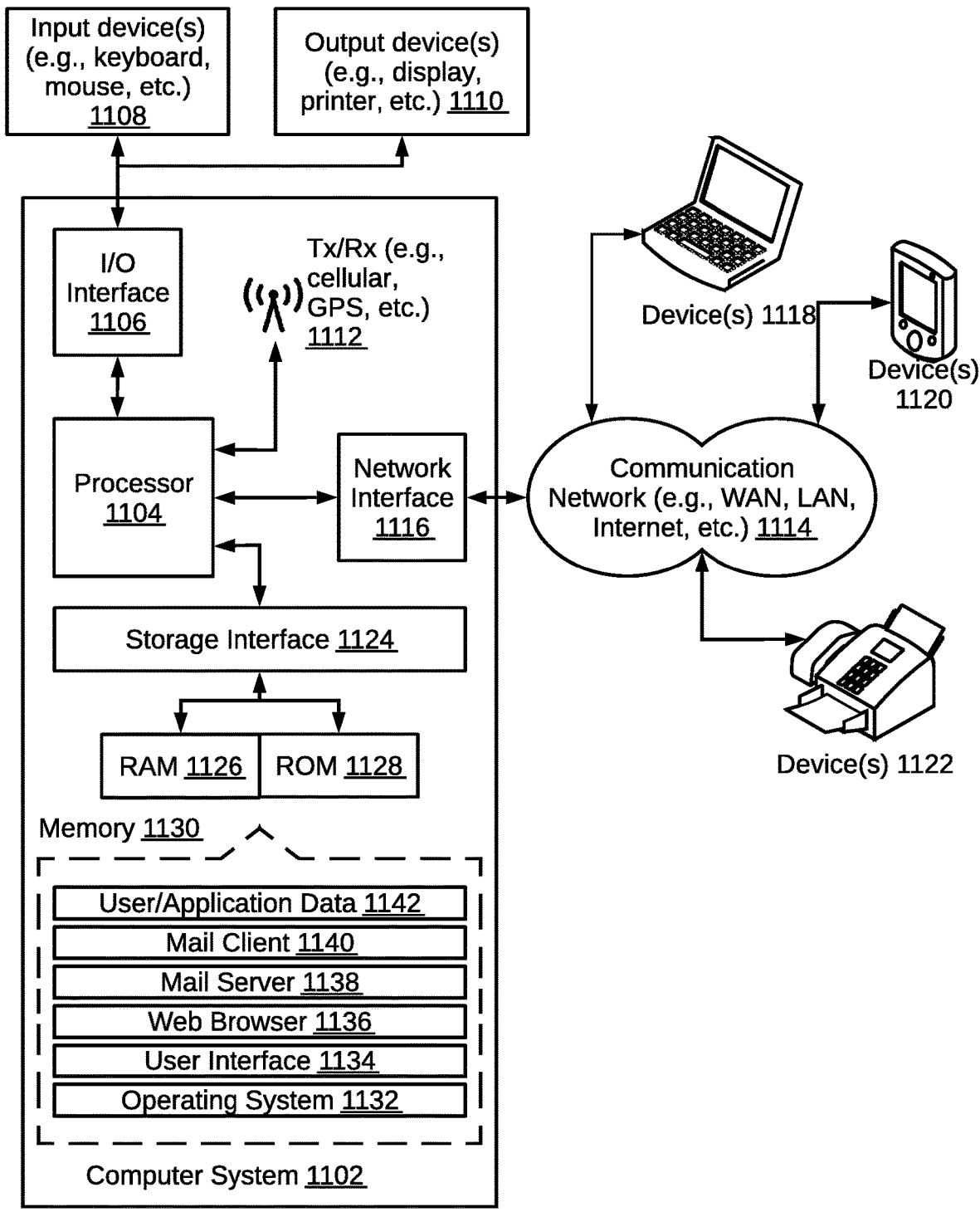
FIG. 11 illustrates a block diagram of an exemplary computer system 702 for implementing various embodiments is disclosed.

FIG. 11 illustrates a block diagram of an exemplary computer system 1102 for implementing various embodiments is disclosed. Computer system 1102 may comprise a central processing unit (CPU or processor) 1104. Processor 1104 may comprise at least one data processor for executing program components for executing user- or system-generated requests. A user may include a person, a person using a device such as such as those included in this disclosure, or such a device itself. Processor 1104 may include specialized processing units such as integrated system (bus) controllers, memory management control units, floating point units, graphics processing units, digital signal processing units, etc. Processor 1104 may include a microprocessor, such as AMD Athlon, Duron or Opteron, ARM's application, embedded or secure processors, IBM PowerPC, Intel's Core, Itanium, Xeon, Celeron or other line of processors, etc. Processor 1104 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 1104 may be disposed in communication with one or more input/output (I/O) devices via an I/O interface 1106. I/O interface 1106 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using I/O interface 1106, computer system 1102 may communicate with one or more I/O devices. For example, an input device 1108 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. An output device 1110 may be a printer, fax machine, video display (e.g., cathode ray tube (CRT), liquid crystal display (LCD), light-emitting diode (LED), plasma, or the like), audio speaker, etc. In some embodiments, a transceiver 1112 may be disposed in connection with processor 1104. Transceiver 1112 may facilitate various types of wireless transmission or reception. For example, transceiver 1112 may include an antenna operatively connected to a transceiver chip (e.g., Texas Instruments WiLink WL1283, Broadcom BCM4760IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, processor 1104 may be disposed in communication with a communication network 1114 via a network interface 1116. Network interface 1116 may communicate with communication network 1114. Network interface 1116 may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. Communication network 1114 may include, without limitation, a direct interconnection, local area network (LAN), wide area network (WAN), wireless network (e.g., using Wireless Application Protocol), the Internet, etc. Using network interface 1116 and communication network 1114, computer system 1102 may communicate with devices 1118, 1120, and 1122. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 1102 may itself embody one or more of these devices.

In some embodiments, processor 1104 may be disposed in communication with one or more memory devices (e.g., a RAM 1126, a ROM 1128, etc.) via a storage interface 1124. Storage interface 1124 may connect to memory devices 1130 including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

Memory devices 1130 may store a collection of program or database components, including, without limitation, an operating system 1132, a user interface application 1134, a web browser 1136, a mail server 1138, a mail client 1140, a user/application data 1142 (e.g., any data variables or data records discussed in this disclosure), etc. Operating system 1132 may facilitate resource management and operation of computer system 1102. Examples of operating system 1132 include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 1134 may facilitate display, execution, interaction, manipulation, or operation of program components through textual or graphical facilities. For example, user interfaces may provide computer interaction interface elements on a display system operatively connected to computer system 1102, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, computer system 1102 may implement web browser 1136 stored program component. Web browser 1136 may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, computer system 1102 may implement mail server 1138 stored program component. Mail server 1138 may be an Internet mail server such as Microsoft Exchange, or the like. Mail server 1138 may utilize facilities such as ASP, ActiveX, ANSI C++/C#, Microsoft .NET, CGI scripts, Java, JavaScript, PERL, PHP, Python, WebObjects, etc. Mail server 1138 may utilize communication protocols such as internet message access protocol (IMAP), messaging application programming interface (MAPI), Microsoft Exchange, post office protocol (POP), simple mail transfer protocol (SMTP), or the like. In some embodiments, computer system 1102 may implement mail client 1140 stored program component. Mail client 1140 may be a mail viewing application, such as Apple Mail, Microsoft Entourage, Microsoft Outlook, Mozilla Thunderbird, etc.

In some embodiments, computer system 1102 may store user/application data 1142, such as the data, variables, records, etc. as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Various embodiment of the invention provides methods, system, and computer program products for retrieving relevant documents. The method allows for retrieving relevant documents from a plurality of documents in a faster and efficient manner. The query input by the user to retrieve relevant documents is modified to generate an enhanced query which increases the hit ratio and accuracy of the query and captures the most relevant documents from the plurality of documents available in a database. The retrieved relevant documents are rendered to the user in an order that makes it easy for the user to review the relevant documents. Further, the method allows the user to interact with the relevant documents using a visual map. The visual map organizes the information in a manner that facilitates monitoring of user interaction data. The monitored user interaction data helps in generating monitoring feedback data which is used for modifying the enhanced query to generate a modified enhanced query. The user can choose to re-run the searches using the modified enhanced query if the user is not satisfied with the initial set of retrieved relevant documents that have been rendered to the user. Additionally, the method allows for customizing the scoring function based on the type of documents that are being searched, thereby making the entire process interactive while ensuring that relevant documents are identified.

The specification has described systems and methods for retrieving relevant documents. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term 'computer-readable medium' should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method of retrieving and presenting at least one document from a database, comprising:
    obtaining, from a user, a first query comprising user-specified parameters;
    generating, by a processor, on the basis of the user-specified parameters, at least one additional parameter, wherein the at least one additional parameter is generated semantically;
    selecting, by the processor, on the basis of the user-specified parameters and the at least one additional parameter, a plurality of documents from the database;
    presenting a set of documents from the plurality of documents in an order determined on the basis of a subset of the user-specified parameters; and
    displaying, for each of the set of documents, a visual map to the user, wherein the visual map comprises a plurality of components displayed for a given document, and wherein the plurality of components are configured to assist the user in analyzing contents of the given document, wherein the plurality of components comprises:
        a key text portion component associated with the given document, wherein the key text portion is configured to:
            receive at least one second query, from the user, specifying relative arrangement of at least two query terms, wherein the first query is different from the at least one second query; and
            identify at least one key text portion in the given document based on the received at least two query terms and the specified relative arrangement.

2. The method of claim 1, further comprising calculating, for the set of documents, a document scoring function, wherein the document scoring function evaluates an extent to which a set of search parameters are matched by the set of documents, wherein the set of search parameters comprises at least one of the user-specified parameters or the additional parameters.

3. The method of claim 2,
wherein the document scoring function is calculated at least partly on the basis of a term frequency of at least one keyword in the at least one document,
wherein calculating the document scoring function involves calculating a term scoring function, and
wherein the term scoring function yields a numerical score on the basis of the term frequency, wherein a curve of the term scoring function comprises an accelerating region, a linear region, and a saturation region.

4. The method of claim 3, wherein the document scoring function is defined by equation $S=\Sigma_i Si$, where Si is score contribution of $i^{th}$ keyword and Si is defined by equation $S_i = A + \tan^{-1}(n_i/B - C)$, where A, B, and C are constants and $n_i$ is-term frequency.

5. The method of claim 1, further comprising presenting the set of documents in accordance with a classification criteria, wherein the classification criteria is based on at least one of classification codes, keywords, assignees, inventors, a time period, a publication date, or a date of receiving the at least one document.

6. The method of claim 1, wherein the plurality of components comprises at least one of:
a location component associated with keywords of the query present in the presented set of documents, wherein the location component is configured to identify location of keywords of interest to the user in the presented set of documents;
a colour component associated with the keywords of the query present in the presented set of documents, wherein the colour component is configured to differentiate dissimilar keywords in the presented set of documents by assigning similar colours to similar keywords and different colours to dissimilar keywords;
a section component associated with the presented set of documents, wherein the section component is configured to identify various sections within the presented set of documents;
a paragraph component associated with the presented set of documents, wherein the paragraph component is configured to differentiate amongst paragraphs within the presented set of documents;
a score component associated with the presented set of documents; and
a key insight component associated with the presented set of documents.

7. The method of claim 6, wherein the key text portion comprises information pertaining to one or more of a crux of the set of documents, a conclusion of the set of documents, and an objective of the set of documents, and wherein the information is extracted on the basis of a query different from the query obtained from the user.

8. The method of claim 1 further comprising monitoring an interaction of the user with the set of documents to obtain monitoring data, wherein the monitoring data comprises at least one of:
an amount of time spent by the user on the set of documents, a text from the set of documents, or an image from the set of documents;
one or more of the user-specified parameters and the additional parameters, which are present in the set of documents or a text rendered on user's screen; and
a list of documents short listed by the user from the set of documents.

9. The method of claim 8 further comprising generating monitoring feedback data by processing the obtained monitoring data, wherein the processing comprises correlating at least one of:
a time spent by the user on a particular document of the set of documents;
the time spent by the user on the particular document and first keywords extracted from the particular document;
the time spent by the user on the particular document and a time period of filing of the particular document;
the time spent by the user on the particular document and inventors of the particular document;
the time spent by the user on the particular document and assignees of the particular document; and
the time spent by the user on an on-screen text and second keywords extracted from the on-screen text.

10. The method of claim 9, wherein the monitoring feedback data comprises:
a list of keywords, wherein each keyword of the list of keywords is associated with a weight, and wherein the list of keywords includes the first keywords and the second keywords;
a list of classification codes, wherein each classification code of the list of classification codes is associated with a weight;
a list of inventor names;
a list of assignee names; and
a list of anchor-citation points.

11. The method of claim 10, wherein the monitoring feedback data is used to change the at least one additional parameter, wherein the change comprises one or more of:
adding or removing at least one classification code of the list of classification codes,
adding disambiguation information for specific keywords of the query,
adding a semantic specification for the specific keywords,
changing a weight associated with the specific keywords,
changing a weight associated with a classification code,
adding a truncation function for the specific keywords,
adding or removing an inventor name of the list of inventor names,
adding or removing an assignee name of the list of assignee names, and
adding or removing at least one anchor citation point of the list of anchor-citation points.

12. The method of claim 1, wherein the user-specified parameters include at least one of keywords, classification codes, time periods, assignees, inventors, authors, anchor citation points, or section properties, and the at least one additional parameter comprises at least one of keywords, classification codes, assignees, inventors, or authors.

13. A system for retrieving and presenting documents, the system comprising:
a database comprising a plurality of documents; and
a computing device operatively coupled with the database, the computing device comprising a memory and a processor, wherein the processor is configured to:
obtaining, from a user, a first query comprising user-specified parameters;
determine on the basis of the user-specified parameters, at least one additional parameter, wherein the at least one additional parameter is generated semantically;
select on the basis of the user-specified parameters and the at least one additional parameter, a plurality of documents from the database;

present a set of documents from the plurality of documents in an order determined on the basis of a subset of the user-specified parameters; and display, for each of the at least one document, a visual map to the user, wherein the visual map comprises a plurality of components displayed for a given document, and wherein the plurality of components are configured to assist the user in analyzing contents of the given document, wherein the plurality of components comprises:

a key text portion component associated with the given document, wherein the key text portion is configured to:

receive at least one second query, from the user, specifying relative arrangement of at least two query terms, wherein the first query is different from the at least one second query; and identify at least one key text portion in the given document based on the received at least two query terms and the specified relative arrangement.

14. The system of claim 13, wherein the processor is further configured to calculating, for the set of documents, a document scoring function, wherein the document scoring function evaluates an extent to which a set of search parameters are matched by the set of documents, wherein the set of search parameters comprises at least one of the user-specified parameters or the additional parameters.

15. The system of claim 13, wherein the processor is further configured to present the set of documents in accordance with a classification criteria, wherein the classification criteria is based on at least one of classification codes, keywords, assignees, inventors, a time period, a publication date, or a date of receiving the set of documents.

16. The system of claim 13, wherein the plurality of components comprises at least one of:

a location component associated with keywords of the query present in the presented set of documents, wherein the location component is configured to identify location of keywords of interest to the user in the presented set of documents;

a colour component associated with the keywords of the query present in the presented set of documents, wherein the colour component is configured to differentiate dissimilar keywords in the presented at least one document by assigning similar colours to similar keywords and different colours to dissimilar keywords;

a section component associated with the presented set of documents, wherein the section component is configured to identify various sections within the presented set of documents;

a paragraph component associated with the presented set of documents, wherein the paragraph component is configured to differentiate amongst paragraphs within the presented set of documents;

a score component associated with the presented set of documents; and a key insight component associated with the presented set of documents.

17. The system of claim 13, wherein the processor is further configured to monitor an interaction of the user with the set of documents to obtain monitoring data, wherein the monitoring data comprises at least one of:

an amount of time spent by the user on the set of documents, a text from the set of documents, or an image from the set of documents;

one or more of the user-specified parameters and the additional parameters, which are present in the set of documents or a text rendered on user's screen; and a list of documents short listed by the user from the set of documents.

18. The system of claim 17, wherein the processor is further configured to generate monitoring feedback data by processing the obtained monitoring data, wherein the processing comprises correlating at least one of:

a time spent by the user on a particular document of the set of documents;

the time spent by the user on the particular document and first keywords extracted from the particular document;

the time spent by the user on the particular document and a time period of filing of the particular document;

the time spent by the user on the particular document and inventors of the particular document;

the time spent by the user on the particular document and assignees of the particular document; and the time spent by the user on an on-screen text and second keywords extracted from the on-screen text.

19. The system of claim 18, wherein:

the monitoring feedback data comprises:

a list of keywords, wherein each keyword of the list of keywords is associated with a weight, and wherein the list of keywords includes the first keywords and the second keywords;

a list of classification codes, wherein each classification code of the list of classification codes is associated with a weight;

a list of inventor names;

a list of assignee names; and a list of anchor-citation points; and the monitoring feedback data is used to change the at least one additional parameter, wherein the change comprises one or more of:

adding or removing at least one classification code of the list of classification codes, adding disambiguation information for specific keywords of the query, adding a semantic specification for the specific keywords, changing a weight associated with the specific keywords, changing a weight associated with a classification code, adding a truncation function for the specific keywords, adding or removing an inventor name of the list of inventor names, adding or removing an assignee name of the list of assignee names, and adding or removing at least one anchor citation point of the list of anchor-citation points.

20. A method of retrieving and presenting from a database, comprising:

obtaining, from a user, a query comprising user-specified parameters;

generating, by a processor, on the basis of the user-specified parameters, at least one additional parameter, wherein the at least one additional parameter is generated semantically;

selecting, by the processor, on the basis of the user-specified parameters and the at least one additional parameter, a plurality of documents from the database;

presenting a set of documents from the plurality of documents in an order determined on the basis of a subset of the user-specified parameters;

calculating, for the set of documents, a document scoring function,
> wherein the document scoring function evaluates an extent to which a set of search parameters are matched by the set of documents,
> wherein the document scoring function is calculated at least partly on the basis of a term frequency of at least one keyword in the set of documents,
> wherein calculating the document scoring function involves calculating at least one term scoring function,
> wherein each of the at least one term scoring function yields a numerical score on the basis of the term frequency, wherein a curve of the term scoring function comprises an accelerating region, a linear region, and a saturation region, and
> wherein the document scoring function is summation of numerical scores yielded by each of the at least one term scoring function; and displaying, for each of the set of documents, a visual map to the user, wherein the visual map comprises a plurality of components displayed for a given document, and wherein the plurality of components are configured to assist the user in analyzing contents of the given document, wherein the plurality of components comprises:
> a key text portion component associated with the given document, wherein the key text portion is configured to:
>> receive at least one second query, from the user, specifying relative arrangement of at least two query terms, wherein the first query is different from the at least one second query; and
>> identify at least one key text portion in the given document based on the received at least two query terms and the specified relative arrangement.

\* \* \* \* \*